Figure 1:
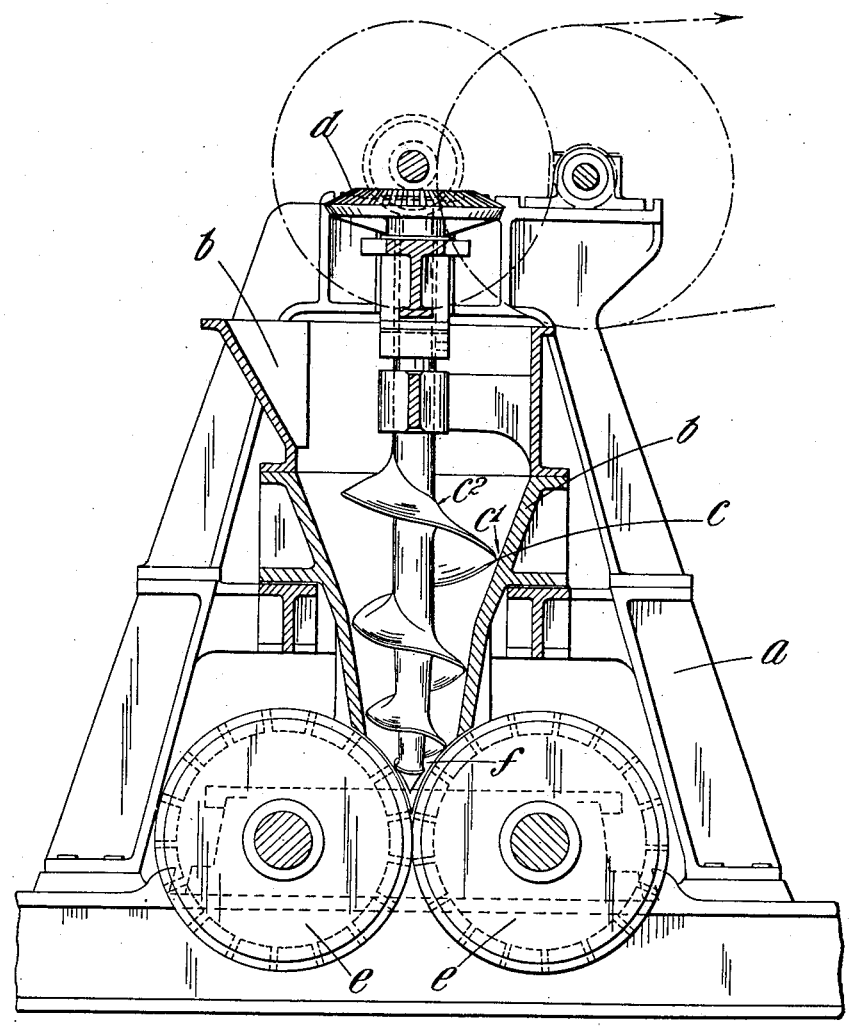

D. H. BIBB.
BRIQUET MOLDING MACHINE.
APPLICATION FILED JULY 11, 1919.

1,347,361.

Patented July 20, 1920.
2 SHEETS—SHEET 1.

Inventor
D. H. Bibb.
By
attorney

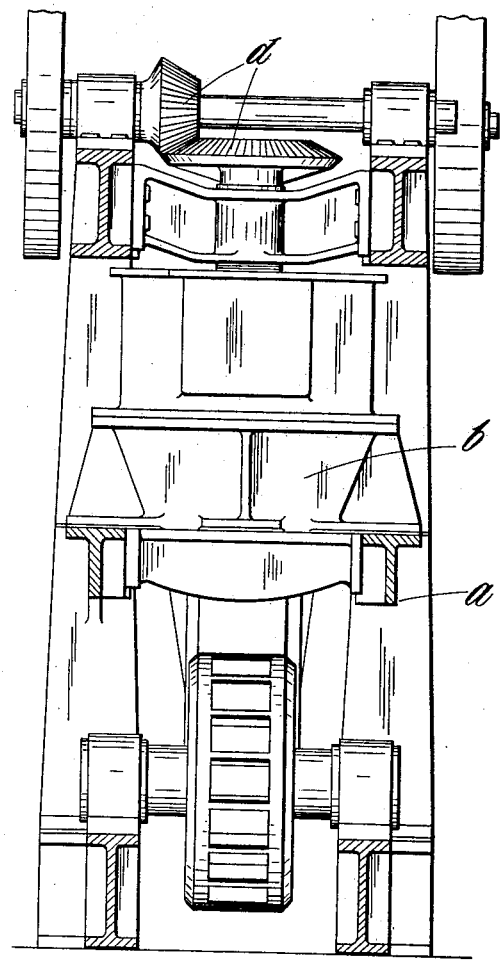

UNITED STATES PATENT OFFICE.

DANDRIDGE HUNT BIBB, OF ALDWYCH, LONDON, ENGLAND.

BRIQUET-MOLDING MACHINE.

1,347,361.

Specification of Letters Patent.  Patented July 20, 1920.

Application filed July 11, 1919. Serial No. 310,240.

*To all whom it may concern:*

Be it known that I, DANDRIDGE HUNT BIBB, a citizen of the United States of America, and resident of the Waldorf Hotel, Aldwych, London, England, have invented certain new and useful Improvements in Briquet-Molding Machines, of which the following is a specification, such as will enable others skilled in the art to which it appertains to make and use the same.

This invention relates to a briquet molding machine of the kind in which a pair of coacting rollers which have molding recesses in their peripheries are fed with the briquet material by a rotating worm or screw in a hopper-like casing arranged above the said rollers.

The chief object of this invention is to so construct the machine that the material to be molded into briquets is fed to the recesses in the rollers under considerable and substantially constant pressure thereby insuring that the briquets are as solid and dense as it is reasonably possible for them to be with the result that the briquets proportionately contain more material, are stronger and weight for weight less bulky than those hitherto made.

The invention consists in carrying down the hopper in which the screw rotates to a position in close contact with the adjoining faces or peripheries of the rollers and also making the hopper and the screw of tapered form with the screw carried to substantially the end of the tapered part of the hopper and preferably with the outer edge of the screw lower than the diametrically opposite upper side of the inner edge so that the upper side of the screw slopes downwardly in radial direction from the center to the edge while the under side may be substantially horizontal or at any desired angle. This sloping of the web of the screw facilitates both the preliminary descent of the material and assists toward the ultimate or final pressure of it at the outlet or delivery end of the hopper.

An example of the invention is shown in the accompanying drawings in which:—

Figure 1 is a side elevation of a machine partly in section and Fig. 2 is an end view of the same machine.

In this example the frame $a$ of the machine supports the hopper $b$ in which the taper screw $c$ is rotated by gear $d$. It will be seen that the outer edge of the screw as at $c'$, is distinctly lower than the diametrically opposite inner edge as at $c^2$. Two molding rollers $e$ $e$ are mounted on the lower part of the machine and are rotated in opposite directions.

The peripheries of the rollers are recessed in any convenient form and are adapted to receive the material from the restricted outlet $f$ of the hopper, said material being under a pressure from the screw, which is carried through the tapered end of the hopper, far in excess of what would be obtained if it was allowed to fall a distance from the hopper to the rollers.

I have not thought it necessary to show the recesses in the rollers as these are a known feature and may be of any suitable size or shape.

The proportionate rate of rotation of the screw $c$ and the rollers $e$ $e$ may be raised so that the density or pressure of the feed of material to the rollers may be altered according to the kind of material and the size of the recess.

What I claim and desire to secure by Letters Patent is:—

1. A briquet molding machine comprising a framework, a pair of rollers, a hopper above the rollers, a tapered lower part to the hopper, a tapered screw in the said lower part and having a web which is sloped downwardly from about the center to the outer edge the said screw having its smaller end adjacent the periphery of the said rollers, means for rotating the rollers in opposite directions and means for rotating the said screw.

2. A briquet molding machine comprising a framework, a pair of rollers, a hopper above the rollers, a tapered lower part to the hopper, a tapered screw in the said lower part extending downwardly with its smaller end extending outside the said lower part adjacent the periphery of the said rollers, means for rotating the rollers in opposite directions and means for rotating the said screw.

3. A briquet molding machine comprising a framework, a pair of rollers, a hopper above the rollers, a tapered lower part to the hopper, a tapered screw in the said lower part and having a web which is sloped downwardly from about the center to the outer edge the said screw having its smaller end extending outside the said lower part adjacent the periphery of the said rollers, means for rotating the rollers in opposite directions and means for rotating the said screw.

4. A briquet molding machine, including a frame, a pair of rollers, a hopper mounted in the frame, a tapered screw within the hopper, having the radii of the blade inclined to the axis and means for rotating the rollers and the screw.

5. A briquet molding machine, including a frame, a pair of rollers mounted in the frame, a hopper carried thereby, a screw mounted therein having the radii of the blade inclined to the axis, and one end thereof terminating adjacent the peripheries of the rollers, and means for rotating the rollers and the screw.

6. A briquet molding machine, including a frame, a pair of rollers having a plurality of recesses in the faces thereof, rotatably mounted in the frame, a hopper having a tapered lower end mounted above the rollers, a tapered screw mounted in the hopper for rotation and means for rotating the rollers and screw.

In witness whereof I have hereunto set my hand in presence of two witnesses.

DANDRIDGE HUNT BIBB.

Witnesses:
 ED. W. HOWELLS,
 HENRY FAIRBROTHER.